United States Patent Office 2,795,476
Patented June 11, 1957

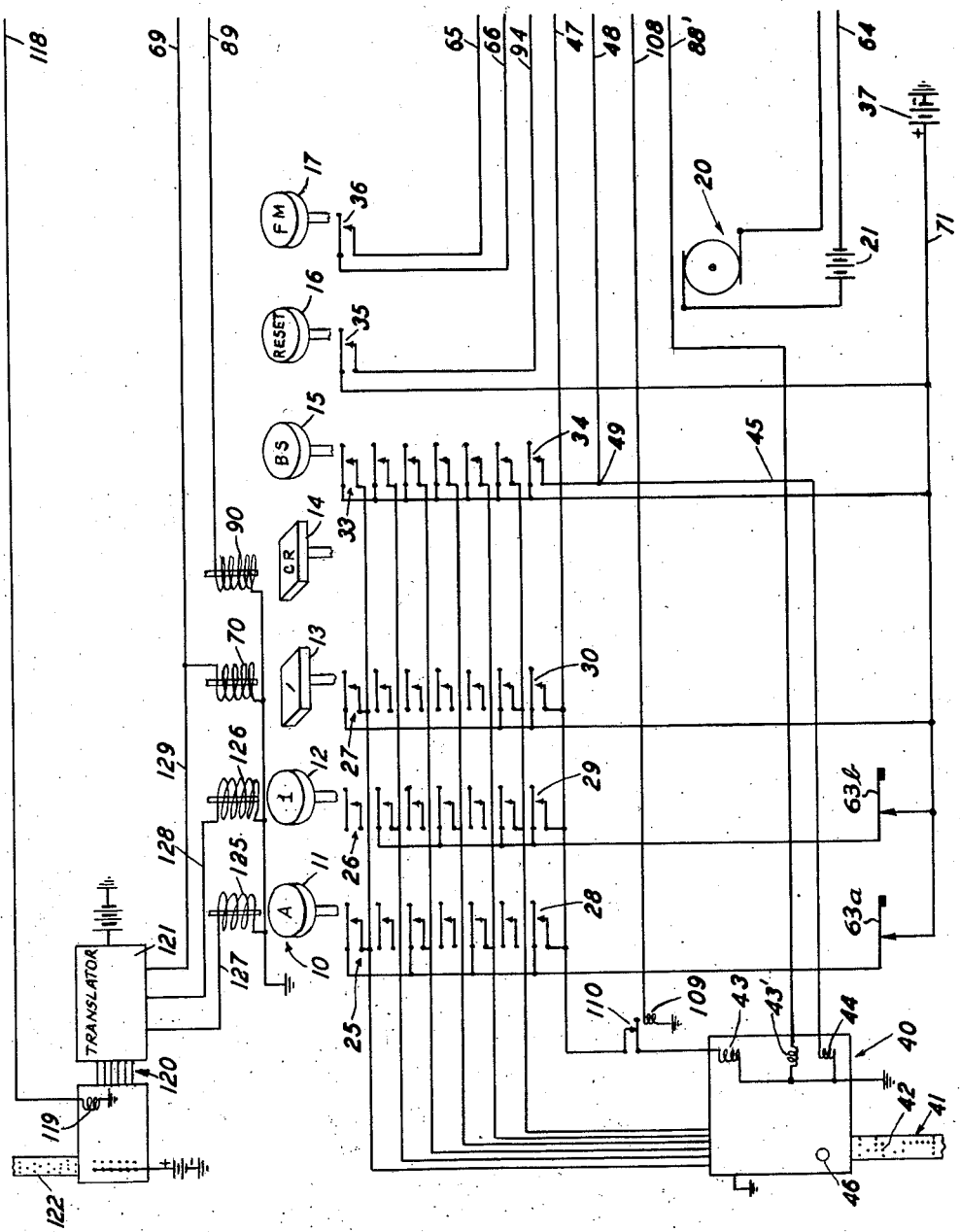

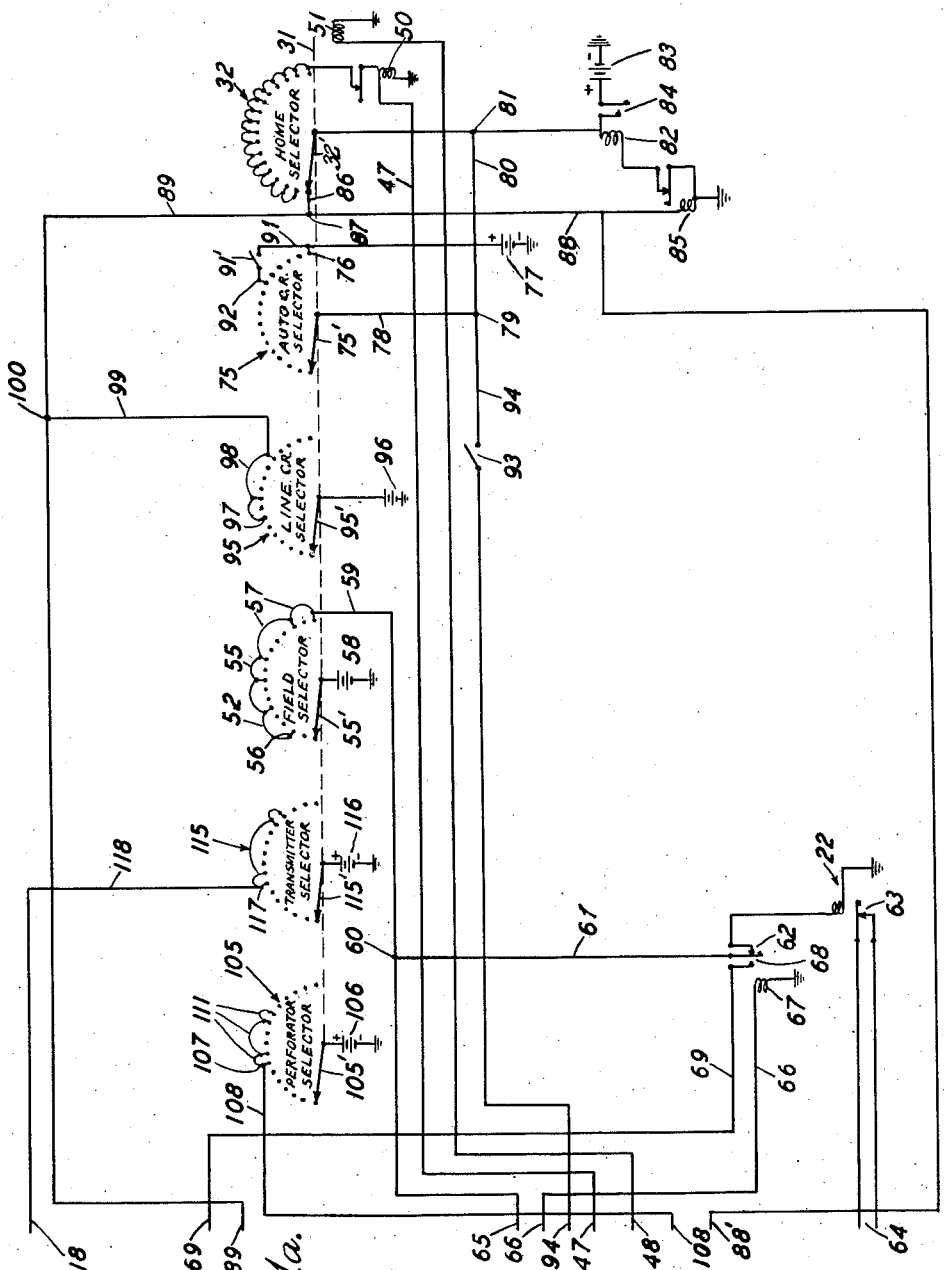

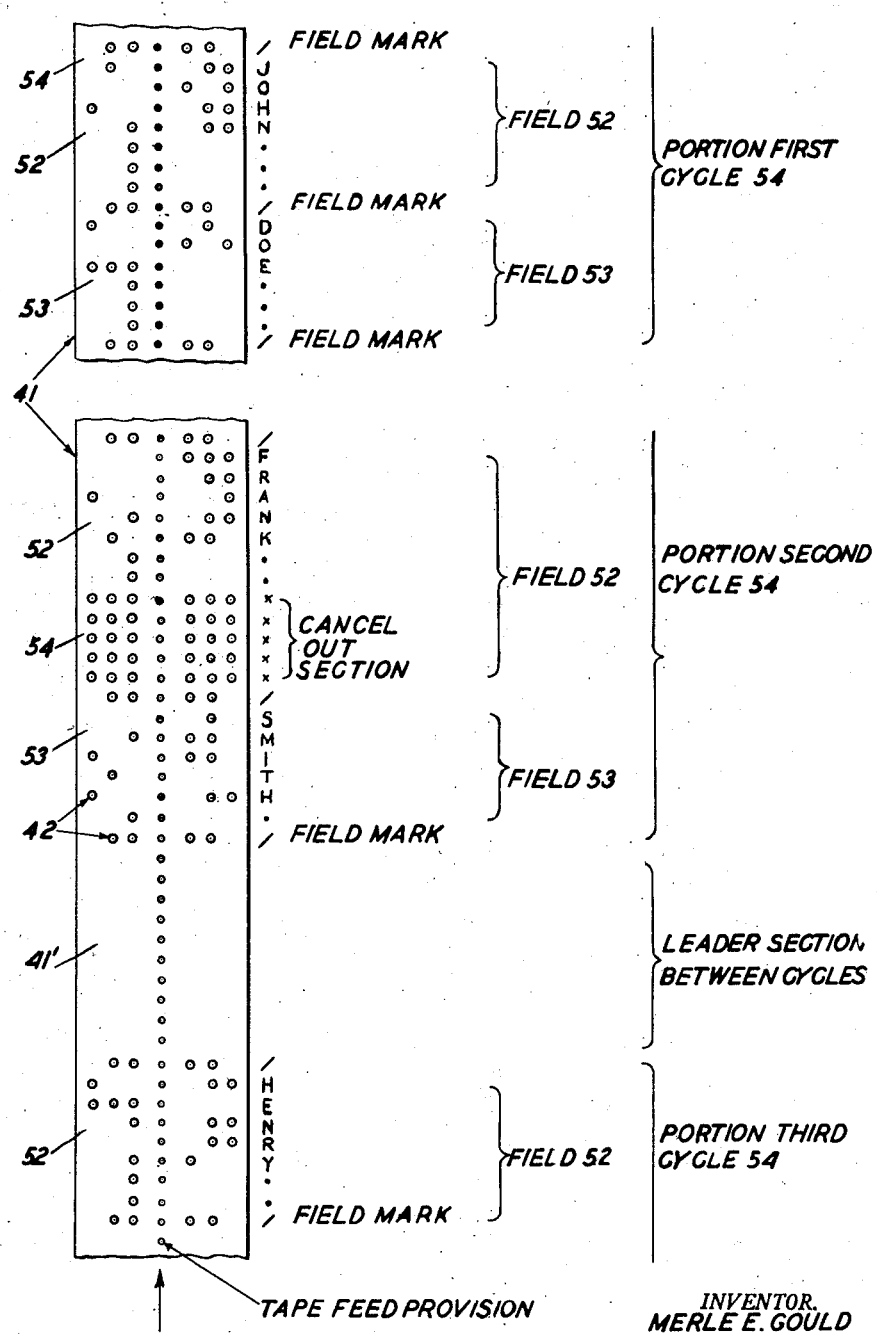

2,795,476

KEYBOARD-CONTROLLED PROGRAMMING AND IMPRINTING APPARATUS, METHOD OF ENTERING DATA AND NOVEL RECORD FORMAT

Merle E. Gould, Stamford, Conn., assignor to Self Winding Clock Company, Inc., a corporation of Delaware Application February 24, 1951, Serial No. 212,568

11 Claims. (Cl. 346—146)

The invention relates to keyboard-controlled imprinting apparatus having the conventional manually operable intelligence and functional keys, and more particularly to apparatus of this nature whereby the making, storing and selection of records of correlated data such as statistics, computations, compilations or combinations of such data in a prearranged order becomes possible. Specifically, the invention is concerned with a novel procedure and means for controlling standardized practice in the transaction of industrial, commercial, financial and institutional business activities.

Heretofore, all clerical or office procedures, involving format, record work, and accounting and statistical routines that require considerable distribution throughout an organization having interdepartmental functional responsibilities, have necessitated the preparation of elaborate, detailed office manuals for the instruction and guidance of all personnel. The introduction and use of present-day, so-called business machines has called for even greater detailed procedures in order to integrate these machine operations into a continuous, sequential flow of the recording operations. In many instances extensive organizational and operational flow-charts are required to further define the interrelated operations.

Furthermore, every operation throughout all of these many steps now is dependent upon the human element for efficient performance or maintenance of the procedure or office standardization even though business machine operations are included. Recognition of this situation is evident in many organizations by the fact that a further system of cross-references and cross-checks is maintained in order to secure the predetermined sequential flow of recording work.

Such integrated systems necessarily increase the amount of transcription of the original data and thereby increase the volume and resulting cost of not only the clerical recording work but also the verification work which in many instances becomes greater than the cost of the initial recording work.

The present invention has for an object to provide a novel combination including keyboard apparatus of the aforesaid type whereby it becomes possible to register automatically the recordings in conformity with a predetermined format and to eliminate thereby to a maximum degree the human element factor heretofore involved in attempting to follow a standardized procedure.

A further object of the invention is to enter in predetermined order data, from an indiscriminate source thereof, merely by the manual actuation of keys of an electrical keyboard-controlled imprinting apparatus by limiting actuation of the keys of said keyboard to a series of successive fields of actuation each of which itself is restricted to a predetermined number of actuations, the series of fields composing a cycle which is repetitive for coverage of the specified work in hand.

A still further object of the invention is to provide automatically acting means which prevent further imprinting at the end of each field until a manually actuable release key is operated.

Another object of the invention is to provide means for the insertion automatically of data from an external source and within predetermined fields only, and under the general control provided.

Still another object of the invention is to provide control means for external apparatus such as a so-called memory storage means, totalizer, computor, etc., for recording of data from the same, the said control means operating selectively within predetermined fields only.

In general, the invention has for an object a novel method of, and apparatus for, effecting recordings and readily adjustable to various conditions imposed by different procedures in the conduct of a business, thus providing for great flexibility.

In carrying out the invention, a manually operable keyboard apparatus of the conventional type is modified in its action to the extent that effective operation of its keys is sequentially controlled automatically by a means which operates in repetitive cycles to control the respective number of effective key actuations possible within successive fields making up a cycle, each field comprising the number of key actuations necessary for the recording of one unit of data, for example, such as a date, name, address, etc.

The nature of the invention, however, will best be understood when described in connection with the accompanying drawings, in which:

Fig. 1–1a is a schematic showing and wiring diagram illustrating the novel controlled programming system for recording and compiling data.

Fig 2 is a plan of a section of the novel tape bearing recordings and also field markings which are provided in accordance with the invention, the same being shown, for example, as punchings through the tape.

Referring to Fig. 1 of the drawings, 10 designates a manually operated keyboard, for example that of an electric typewriter, the keyboard being indicated by a number of its printing key members 11, 12—representative of the intelligence keys—and an intelligence-functional key linkage 13; the remaining members 14 and 15 shown being representative of the so-called functional keys such as the carriage return and back-spacing keys customarily provided in the conventional electric typewriter. However, one of these latter key members, as the typewriter carriage return key member 14, is of the linkage type and is not available for manual actuation; and, in accordance with the present invention, the same is true of the key linkage 13 which is actuated functionally to effect a record or "field mark." Furthermore, two supplementary key members 16 and 17 are provided and are adapted for manual actuation, the former when manually depressed being designed to effect a reset operation, through actuation of key linkage 14 under automatic control, returning the carriage of the keyboard apparatus as well as restoring to its initial position control means for a plurality of selective means, as will hereinafter be more fully set forth. The latter key 17 effects actuation of the field mark key member or linkage 13, likewise under automatic control, to restore effective operation of the intelligence keys and the "back-spacer" functional key—all of which will be hereinafter more fully set forth.

The motor for effecting printing operation of the typewriter 10 in the conventional manner is indicated at 20 and, as is well understood, when no power is supplied to this motor the typewriter is ineffective to provide any operation notwithstanding actuation of its key members. A source of power for actuation of the motor is indicated at 21 and the supply of power to said motor is subject to the action of relay 22.

Each intelligence key member is associated cooperatively with a bank of pulse transmitting code signal contacts 25, 26, and 27, respectively conforming to, for example, a standard six-permutation code for transmission of the respective coded signals; and, in addition, each bank includes a pulse transmitting contact 28, 29, and 30, respectively, for effecting actuation of the shaft 31 of a stepping switch member 32 of any well-known construction and embodying a homing bank. The back-spacer key member 15 of the functional keys likewise has associated therewith a similar bank of pulse transmitting code signal contacts 33 and a pulse transmitting contact 34, while the remaining supplemental and functional keys 16 and 17 are provided each with but a single pulse transmitting contact 35 and 36, respectively. The key or linkage 14 is without contacts and in the typewriter operates purely mechanically but under selector control, hereinafter set forth, to return the carriage in the conventional manner.

When a key of the intelligence group is then depressed as well as the back-spacer key, code signal pulses, obtained from a battery 37 or other source of power, are transmitted to, for example, a conventional six-permutation code recorder herein indicated as a tape perforator 40, or other means, for effecting a record upon the tape, card or other medium 41 of which, for example, corresponding punchings 42, Fig. 2, are made thereby, as is well understood. At the same time a contact 28, 29, 30 or 34 will be closed, any of the first three contacts serving to energize the operating coil 43 of the tape perforator to advance its tape one step in the direction of the arrow, Fig. 2. It will be understood, of course, that any electrically responsive apparatus such as a totalizer or computor may be substituted for the tape perforator 40; also, the recordings may be effected magnetically instead of as punchings, as is well understood.

When it is necessary to make use of the back-spacer key 15, as for correction purposes, its associated contact 34 will serve to energize from battery 37 a further operating coil 44 of the perforator through lead 45, operating it one step in a reverse direction for each key actuation, as well as to effect through the bank of contacts 33 pulse signals to provide a cancellation indication, shown in Fig. 2, in the tape 41, as is well understood. Such cancellation is repeated with each actuation of key 15 but within the limitation of a field.

After the correction has thus been effected, the tape is to be advanced automatically the same number of steps to reset it for subsequent recordings as by means of a manually operated release button 46 provided commonly as an integral part of the perforator, or this may be accomplished manually by the use of a well-known single pulser (not shown).

Actuation of the stepping switch member 32, when any of the contacts 28, 29, 30 and 34 is closed, is effected through the resulting pulse to cause the wiper 32' of the switch member to advance accordingly one step over its contacts under the influence of the energized relay coil 50, in the case of the contacts 28, 29 and 30 through a lead 47; and under the influence of the energized reverse coil 51, to be reversed in the case of the back-spacer contact 34, power being derived in both instances from the said source 37 and in the latter through a lead 48 connected to lead 25 at the junction point 49.

In accordance with the invention, and as hereinbefore set forth, actuation of intelligence key members is to be restricted to fields of operation of which a predetermined number constitute a cycle of the documentation recording. It will be understood that the various fields may differ in the number of key member actuations allotted to them, as is indicated by groups or fields 52 and 53, of consecutive cycles 54 of recordings, Fig. 2 of the drawings, the cycles being repetitive as to group arrangement but the resulting coded representative registrations of the various groups differing in import.

In order to effect this field lock-out, a selector member 55, with wiper 55' and contact points in number not in excess of those of the stepping switch member 32, is necessary; and the same operates from the shaft 31 to advance its wiper. As shown, the different points or step positions of said member 55 are variously interconnected in accordance with the desired field definitions. Thus, the first three groups of points would permit of but two key actuations each, the wiper 55' after the first two steps then being in contact with the contact point 56. This establishes through the jumpers 57 a circuit from a source of power as the battery 58, through a lead 59 to the junction point 60. The next two groups similarly permit of two intelligence key actuations each, which is followed by a group of but one actuation, this being followed by a group of three actuations and finally by a group of but one actuation. It will be understood, of course, that the particular groupings shown are merely illustrative and that the arrangement thereof will be made to conform to the particular nature of the work.

When wiper 55' thus establishes the circuit aforesaid at any of the group terminal contacts, a lead 61 from the junction 60 energizes through a normally closed contact 62 the relay 22 to interrupt, at the normally closed contact 63, the circuit 64 to motor 20 which controls the imprinting upon intelligence key actuation, and also to interrupt at the normally closed contacts 63a, 63b (Fig. 1), the circuit from contacts 28, 29 to stepping switch coil 50 to prevent actuation of wiper 55'. Any such actuation will then be ineffective and no print or other record is made, as is well understood in connection with the operation of conventional electric typewriters. Also, no further advance to a successive field is then possible, the wiper 55' remaining upon the contact point 56.

In order to operate in the next-succeeding field, provision is made to first effect a record both in the printing and in the punching or other recording, of the completion of the allotted actuations in the preceding field. To this end, the further key 17 must be depressed to advance not only the wiper 32' but particularly the wiper 55' one point. This, in the case of the latter wiper, locates the same upon a dead point—the first of the next-succeeding group or field. In depressing the key 17, a circuit is closed at the contact 36 through leads 65 and 66, which circuit includes a relay 67 operating to transfer the power from lead 61 to a contact 68, at the same time opening contact 62 to restore the motor circuit. In thus transferring power to the contact 68, a further lead 69 therefrom energizes a solenoid 70 operatively associated with the key member or linkage 13 to effect an actuation thereof for printing. At the same time contacts 27 are closed to effect transmission of the corresponding code signal pulses to record the same on the tape. Also, the closing of contact 30 of this bank of contacts energizes the relay coil 50 for advancing both the wipers 32' and 55', power being provided from the battery 37 through the lead 71, contact 30 and lead 47.

When the cycle of these successive fields has been completed, it becomes necessary to return or "home" the selector member 55 through the action of the stepping switch 32. A further selector member 75, operating with shaft 31 and having a wiper 75', is provided to effect this automatically. The contact points of this selector 75 are equal in number to those of the said selector 55 and at least to those of stepping switch or homing selector 32—all operating in synchronism. The stepping switch 32, however, may have points in excess of effective points of the selectors being provided generally of an even number of points or multiples thereof. In other words, cyclic operation points can be less but never greater in number than the number of operative points of the homing or stepping switch.

The terminal point 76 of the selector 75 is permanently connected to a source of power as the battery 77. When wiper 75' of this selector eventually contacts the said terminal point 76, energy is transmitted through the lead 78 to the junction point 79, lead 80 and junction point 81, at which it divides into two circuits—one to energize a relay 82 to introduce an additional source of power 83, locked in thereby at the normally open contact 84, and the other to energize the coil 50 to remove the wipers 32' and 75' from their respective contacts and reestablish contact at the respective starting points, in the case of the stepping switch 32 at the point 86. This latter circuit connection eliminates the power source 77 as well as the source 83.

Power was thus momentarily available as a pulse at a junction point 87 connected to point 86 and travelled over two circuits—one circuit comprising lead 89 to effect return of the typewriter carriage and the other to energize relay 85 through the lead 88 to disconnect the source of power 83. For the carriage return, the power transmitted over the lead 89 energized a solenoid 90 which actuates the key member or linkage 14 for this purpose. Also, the power pulse from the selector member 32 will, through a lead 88', actuate an operating coil 43' to advance a leader portion 41' of the tape 41.

Provision may be made in connection with the carriage return and the restoring of the selector member 75 and homing of the stepping switch 32 to bring about this return function at any desired intermediate point in the cycle, this involving, however, a manual operation. For example, as is indicated, a jumper connection 91, which includes a manually operable, normally open switch 91' or the like, is provided between the terminal point 76 of the selector 75 and the chosen intermediate point 92, which point, however, must correspond with a field termination point of the selector 55.

In some instances, such as a "false start," it may be desirable or even necessary to provide for a manual resetting or restoring of both the selector member with stepping switch and the typewriter carriage to their initial operating positions. For example, the operator may have begun transcription from a wrong document and, irrespective of the location within the cycle, desires to disregard the recording and start afresh. This requires merely the addition of a further manually operable switch 93 and the additional function key 16 for energizing momentarily, from the source of power 37, the advancing coil 50 of stepping switch 32. When the switch 93, which may be of the key-locked type, is then closed and the key member 16 depressed to close momentarily its contact 35, a power connection will be established from the source 37 through lead 71 and a lead 94 to the lead 80 and the previously described homing circuit.

Since there is a definite limitation to the carriage capacity or travel of a keyboard apparatus and the work within a cycle may require recordings in excess of a single line of carriage operation, it is obviously necessary that the carriage be returned one or more times during a cycle. To this end a second further selector member 95 is provided, operating synchronously with the stepping switch 32, and adapted to be connected with a source of power 96 through its wiper 95'. Contact points, such as the points 97, are interconnected through jumpers 98 and lead 99 to the junction 100 with lead 89, which causes energization of the carriage return solenoid 90 whenever wiper 95' contacts any of the interconnected points. The junction point 100 is connected through leads 89, 88 and 88' to the coil 43' and will thus also energize the same to advance the tape leader portion to indicate intermediate carriage returns.

Provision is also made to control the signal recording means or perforator operation to dispense temporarily with perforations by the perforator 40 where portions of the typed record are not required for recording on the tape This involves a still further selector member 105 with its associated wiper 105' rotated from the shaft 31 over contact points in number not to exceed the points of stepping switch 32. This selector, the wiper of which is connected to a source of power as the battery 106, acts through said wiper when the latter contacts any predetermined point such as the contact point 107 to transmit power through a lead 108 to the coil of relay 109 to open its normally closed contact 110. This disconnects the operating coil 43 of the perforator 40 so that any pulses transmitted from the actuation of keys will be interrupted and without effect on said coils. Jumpers 111 to various other contact points will establish a nonoperative condition for the perforator at different intervals within a cycle.

To introduce external data at predetermined portions of a cycle for the printing as well as for the perforating of a tape, if desired, an additional selector member 115 is required with operative contacts in number conforming to the stepping switch 32 and having an associated wiper 115' rotated from the shaft 31, the said wiper being directly connected to a source of power such as the battery 116. At a predetermined point or points such as the point 117 connection is made through a lead 118 to the operating coil 119 of a means 120 for transmitting external data to the typewriter. In the present embodiment this means is shown by way of example as a conventional six-permutation code perforated tape transmitter, the tape 122 bearing the desired data such as stock numbers, unit prices and other memory storage matter, and operating through a translator 121 of conventional or special design. The latter selects a lead for the intelligence keys of the typewriter to actuate the same in accordance with the code punched in the tape 122, as is well understood.

It is understood, of course, that the external data introducing means may be of the computor type, totalizer type, memory storage type, etc. The key actuations to effect such record on the typewriter, and if desired to the perforator 40, results from the energization of corresponding solenoids 125, 126 and 70 which are then energized from the translator source of power through respective leads 127, 128 and 129.

The interruptions temporarily of the perforator operation, as well as the introductions of external data, it will be appreciated, occur only within the operational limits of a field; and that to restore the apparatus for operation in a succeeding field, the key 17 must be manually depressed as hereinbefore described.

I claim:

1. In combination: an electrically operable keyboard apparatus having the conventional manually operable intelligence and functional keys and supplementary functional keys, one of which constitutes an operation-restoring key; electrical selective means to render said operation-restoring key effective only at completion of respective groups of intelligence key actuations, with each group comprising a predetermined number of such actuations and the said groups constituting successive fields of operation; means associated with all of said keyboard apparatus conventional keys, except one of the functional keys thereof, adapted for the transmission of electrical pulses upon actuation of a said key; an electrical stepping switch responsive to the transmitted pulses for operating the electrical selective means; and electrical means controlled by said electrical selective means at predetermined intervals, to interrupt effective operation of all of said keys except the supplementary functional keys; and further electrical means controlled by actuation of said operation-restoring key to close an energizing circuit to said electrical means to restore automatically effective operation of all of the conventional keys.

2. The combination according to claim 1, wherein another of the supplementary keys is provided with a contact to close an electrical circuit to effect actuation of the electrical stepping switch to a reset location.

3. The combination according to claim 1, wherein a further electrical selective means synchronously operative with the said electrical stepping switch is provided for control of actuation of the excepted one of the conventional functional keys at a predetermined field termination for return of the carriage of the keyboard apparatus.

4. The combination according to claim 2, wherein a manually operable switch is provided, operative together with the other of the manually operable supplementary functional keys for momentarily closing a circuit thereat for actuating the stepping switch to advance the further electrical selective means to the end of a cycle.

5. The combination according to claim 1, wherein signal recording means are provided responsive to pulses transmitted upon actuation of the intelligence keys and of the operation restoring key of the keyboard apparatus.

6. The combination according to claim 5, wherein an operating coil is provided to effect actuation of the recording means and a still further electrical selective means synchronously operative with the electrical stepping switch is provided, together with electrical means controlled by the still further electrical selective means to interrupt the circuit to the operating coil of the signal recording means.

7. The combination according to claim 1, wherein signal recording means are provided including an operating coil responsive to pulses transmitted upon actuation of the intelligence keys, an electrical contact means is associated with the operation-restoring key, and an operating electrical means is provided for a marker intelligence key to actuate the latter when the operation-restoring key contact is closed for energizing the operating coil.

8. The combination according to claim 7, wherein the closing of the operation-restoring key contact energizes through the first-named electrical selective means the further electrical means to restore effective operation of the remaining keys.

9. The combination according to claim 1, wherein contact means are provided in connection with the conventional back-spacer key of the conventional functional keys of the keyboard apparatus for the transmission of electrical pulses to the electrical stepping switch to influence the same reversely with respect to the influence thereon of the intelligence key initiated pulses.

10. The combination according to claim 9, wherein signal recording means are provided responsive to the pulses transmitted upon actuation of the back-spacer key.

11. The combination according to claim 9, wherein further contact means are provided and are operatively associated with the back-spacer key to transmit electrical pulses to the signal recording means, together with electrical means energized by the pulses, to reverse the advance operation of the signal recording means upon the actuation of said back-spacer key and effect a cancel-out record by the recording means.

References Cited in the file of this patent

UNITED STATES PATENTS

| | | |
|---|---|---|
| 998,833 | Bodwell | July 25, 1911 |
| 1,455,157 | Wood | May 15, 1923 |
| 1,832,118 | Hershey | Nov. 17, 1931 |
| 2,134,005 | Potts | Oct. 25, 1938 |
| 2,250,717 | Long et al. | July 29, 1941 |
| 2,357,297 | Wack et al. | Sept. 5, 1944 |
| 2,452,333 | Spencer et al. | Oct. 26, 1948 |
| 2,529,238 | Angel | Nov. 7, 1950 |
| 2,554,903 | Goetz | May 29, 1951 |